United States Patent [19]

Takata et al.

[11] Patent Number: 5,399,014

[45] Date of Patent: Mar. 21, 1995

[54] MIXING APPARATUS

[75] Inventors: Kazutaka Takata; Masahiko Kikuchi; Hisayoshi Ito; Eisuke Sato, all of Hyogo, Japan

[73] Assignee: Shinko Pantec Company Ltd., Kobe, Japan

[21] Appl. No.: 11,839

[22] Filed: Feb. 1, 1993

Related U.S. Application Data

[63] Continuation of Ser. No. 741,074, Aug. 6, 1991, abandoned.

[30] Foreign Application Priority Data

Aug. 7, 1990 [JP] Japan ................... 2-209808
Dec. 11, 1990 [JP] Japan ................... 2-401347

[51] Int. Cl.$^6$ .............................................. B01F 7/18
[52] U.S. Cl. ............................... 366/262; 366/293; 366/306; 366/328; 366/329
[58] Field of Search ............... 366/292, 302, 306, 325, 366/326, 327, 328, 329, 330, 279, 244, 245, 247, 249, 251, 253, 262, 343, 246, 293

[56] References Cited

U.S. PATENT DOCUMENTS

| | | | |
|---|---|---|---|
| 58,337 | 9/1866 | Clift | 366/325 |
| 66,377 | 7/1867 | Naquin et al. | 366/325 |
| 72,682 | 12/1867 | Risher | 366/325 |
| 85,272 | 12/1868 | Brewer | 366/325 |
| 99,312 | 2/1870 | Hamblin | 366/302 |
| 132,483 | 10/1872 | Muth | 366/325 |
| 138,519 | 5/1873 | Noah | 366/325 |
| 138,604 | 5/1873 | Beckley | 366/307 |
| 640,369 | 1/1900 | Cross | 366/328 |
| 742,016 | 10/1903 | Fetzer | 366/302 |
| 1,082,513 | 12/1913 | Gaines | 366/253 |
| 2,061,547 | 11/1936 | Bumpus | 366/247 |
| 2,558,037 | 6/1951 | Calhoun, Jr. et al. | 366/325 |
| 3,012,977 | 12/1961 | Wilson et al. | 366/293 |
| 3,071,352 | 1/1963 | McIntyre | 366/325 |
| 3,977,655 | 8/1976 | Okabayashi et al. | 366/325 |
| 4,243,636 | 1/1981 | Shiraki et al. | 366/306 |
| 4,312,596 | 1/1982 | Maezawa et al. | |
| 4,479,721 | 10/1984 | Rieger | 366/327 |
| 4,728,731 | 3/1988 | Raehse et al. | 366/307 |
| 4,934,828 | 6/1990 | Janssen | 366/307 |
| 4,936,688 | 6/1990 | Cornell | |
| 5,098,669 | 3/1992 | Kawanami et al. | 366/302 |
| 5,160,041 | 11/1992 | Taniguchi et al. | 366/325 |

FOREIGN PATENT DOCUMENTS

| | | | |
|---|---|---|---|
| 0056158 | 12/1936 | Denmark | 366/325 |
| 222599 | 5/1987 | European Pat. Off. | |
| 2238527 | 2/1975 | France | |
| 3334811 | 3/1984 | Germany | |
| 61-33019 | 10/1981 | Japan | 366/244 |
| 0150821 | 8/1985 | Japan | 366/325 |
| 14784 | of 1887 | United Kingdom | 366/343 |
| 06154 | 7/1989 | WIPO | |

*Primary Examiner*—David A. Scherbel
*Assistant Examiner*—Tony G. Soohoo
*Attorney, Agent, or Firm*—Oblon, Spivak, McClelland, Maier, & Neustadt

[57] ABSTRACT

A mixing apparatus including a vertical cylindrical mixing tank; a rotating shaft vertically installed at the center of the interior of the vertical cylindrical mixing tank; and a plurality of paddle impellers attached at upper and lower stages on the rotating shaft, one of the paddle impellers at the lower stage being disposed close to the bottom of the mixing tank, and each paddle impeller positioned at the upper stage being arranged at crossing angles of less than 90° ahead of the adjacent lower paddle impeller.

21 Claims, 8 Drawing Sheets

VELOCITY VECTORS

CONCENTRATION RESPONSE

VELOCITY VECTORS

CONCENTRATION RESPONSE

FIG. 3
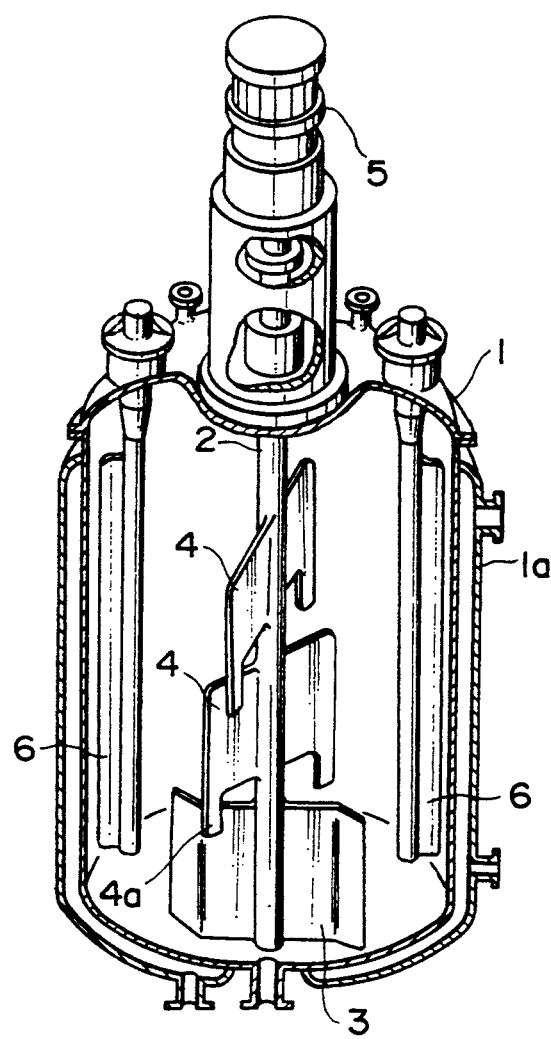
FIG. 4(a)     FIG. 4(b)     FIG. 4(c)
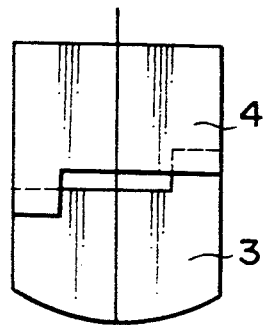   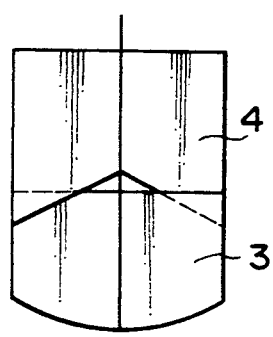   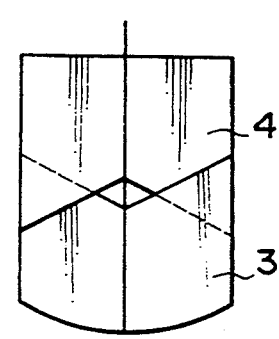

VELOCITY VECTORS — CONTOURS

VELOCITY VECTORS — CONTOURS

FIG. 8(a) L=0.1D
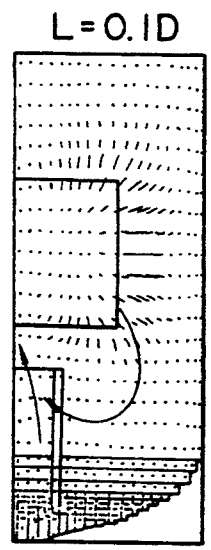
FIG. 8(b) L=0.2D
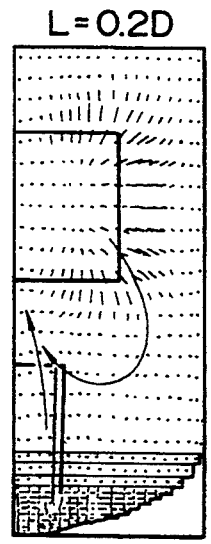
FIG. 8(c) L=0.3D
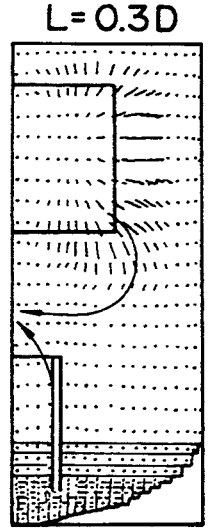

MIXING APPARATUS

This application is a continuation of application Ser. No. 07/741,074, filed on Aug. 6, 1991, now abandoned.

BACKGROUND OF THE INVENTION

1. Field of the Invention

The present invention relates to a mixing apparatus and, more particularly, to a mixing apparatus for efficiently performing such mixing operations as mixing, dissolution, crystallization, reaction, and slurry suspension.

2. Description of the Prior Art

Various types of impellers have been used in mixing tanks for various applications. When it is required to handle liquid over such a wide viscosity range that a flow condition in a tank can change from turbulent to laminar, there have often been used multiple stage impellers of a two-bladed flat paddle type. In most multiple impellers of this type, two impellers, adjacent each other on a rotating shaft are set crosswise, at right angles to each other, because this arrangement is the most stable from the viewpoints of rotational balance and shaft-bending moment caused from fluctuating hydrodynamic forces acting on impeller blades. Multiple impellers of this type usually have a comparatively wide axial clearance between two impellers adjacent to each other in order to decrease the number of impellers required and total power consumed by all the impellers in a tank.

In the meantime mixing apparatuses have been recently demanded to have more efficient and diversified performances so as to be applied to a wide range of mixing operations.

Particularly in batch processes, mixing apparatuses are required to meet the following diversified purposes and high performances.

(1) Uniform mixing; Complete mixing of liquids can be attained over a wide range of viscosity. And complete and uniform mixing can be attained under the conditions of low to high liquid level at various fluid viscosities.

(2) Heat-transfer performance; High heat-transfer coefficients with low power consumption is obtainable.

(3) Solid-liquid mixing; Various types of solid-liquid mixing such as dispersion of higher density particles, uniform mixing of high-concentration slurry, and uniform dispersion by low-shear agitation can be attained.

(4) Liquid-liquid dispersion; Sharp droplet size distribution is obtainable. In addition it is possible to attain uniform liquid-liquid dispersion by low-shear agitation and to attain homogeneous light-liquid dispersion whose viscosity is largely increased through reactions.

The present inventors investigated using conventional mixing apparatuses equipped with multistage impeller systems whether they could satisfy the aforementioned demands. The results of the investigations showed that it is not so difficult to choose a mixing apparatus capable of satisfying any one of the above-described demands. However, it is very difficult to select an apparatus specification capable of simultaneously satisfying many items of the aforementioned demands, since the prior-art mixing apparatuses have the following problems. Accordingly, the use of a mixing apparatus newly improved or developed will become necessary in order to meet the aforementioned demands.

In a mixing apparatus equipped with two-bladed paddle impellers multiply set on a shaft at the crossing angle of 90 degrees, which is described above as a prior-art or conventional type, streamlines are formed around individual impellers by their pumping action but do not sufficiently link each other between different stages of impellers. This can cause separation of flow regions of upper and lower stages, and stagnant points (dead spaces) between them near the tank wall, and these phenomena reduce the efficiencies of mixing performances. The formation of the dead spaces not only reduces heat-transfer performance but sticking and contamination are liable to be caused on the inner wall surface of the tank, and therefore it can adversely affect mixing results.

When flat-blade impellers are used in a multiple paddle impeller structure, a number of separate circulating flows are generated in a tank by the rotation of the impellers. This phenomenon becomes more typical when a clearance L between upper and lower impellers is kept as large as shown in FIG. 6(a). In such a case, since a boundary B is generated by a kind of weak interaction of two circulating flows, mixing between the upper and lower circulating flows is suppressed. On the contrary, the reduction of the clearance L between the impellers by moving them might be considered effective so as to avoid this weak interaction between circulating flows. In this case, however, it is necessary to increase the vertical dimension of either impeller by the same amount as the reduction (h', shown in the FIG. 6(b)) in the impeller clearance L, and this causes an incremental increase in power consumption. Also, in the case of increasing the impeller vertical dimension, the discharged flow is divided at the mid-height of the impeller, and two circulating flows and another boundary B' between them are generated as shown in FIG. 6(b), and thus the result is similar to that in the case of impellers attached with a wide clearance as described above. These phenomena disturb the linkage of circulating flows in the tank.

However, the optimum crossing angle and clearance between each impeller from the viewpoint of overall flow pattern in a tank have not been examined theoretically and quantitatively so that it is difficult to select the apparatus specification for satisfying the above-described demands.

SUMMARY OF THE INVENTION

The present invention has been accomplished in order to solve the problems mentioned above. Its object is to generate one large circulating flow with adequate pressure gradients between multiple stage paddle impellers by arranging the paddle impellers at optimum positions. Therefore mixing efficiency is increased by linking up each circulating flow in a mixing tank under all flow conditions from a turbulent to transitional flow and further to a laminar flow.

In order to accomplish the above-mentioned object, the constitution of the mixing apparatus of the present invention is as follows.

The mixing apparatus of the present invention has a rotating shaft vertically mounted at the center of a vertical cylindrical mixing tank. Paddle impellers composed of wide, flat and vertical blades are vertically aligned on this rotating shaft. Also the lowermost paddle impeller is arranged closer to the bottom surface of the mixing tank and each blade of the paddle impellers attached at upper stages is arranged at a crossing angle of less than 90 degrees as measured in the direction of rotation from a blade of the adjacent lower stage impeller.

In one embodiment of the mixing apparatus of the present invention, the above-mentioned crossing angle is set at 45–75 degrees. In another embodiment, the blades of the lowermost paddle impeller extend rearward with respect to the direction of impeller rotation.

In further embodiments, the lower stage paddle impeller is provided with a larger diameter than the other paddle impellers attached at upper stages.

In yet another embodiment, the clearance between the upper and lower impeller is set to less than 20% of the inner diameter of the mixing tank.

In accordance with an additional embodiment, the upper and lower adjacent paddle impellers are overlapped in their vertical coverages at least at the blade edge part furthest from the shaft.

A radial flow is discharged by the rotation of a mixing impeller in a mixing tank. In a mixing apparatus equipped with paddle impellers arranged vertically at multiple stages, the fluid is discharged by each paddle impeller, and therefore, smoothly linking a number of discharged flows without separation is important to obtain a higher mixing efficiency.

When fluid in a tank is agitated by paddle impellers vertically arranged at multiple stages, each discharged flow in the radial direction tends to diverge into the upper and lower regions of the impeller and then return to the central part of the impeller as shown in FIG. 6(a) around the upper impeller. A circulating flow thus formed by each of these impellers interacts with that formed by the other adjacent impeller, which can cause separation of the circulating flows and disturb flow linkage in the mixing tank.

Furthermore, when two-bladed impellers are mounted at the crossing angle of 90 degrees as often seen in conventional apparatuses, the impeller rotation is under a mechanically stable condition. Out of a certain viscosity range, however, it becomes difficult to smoothly link the flows between the upper and lower impellers, and thus the flow linkage in the mixing tank becomes disturbed.

First, the inventors made particular investigations about a relation between behavior of a circulating flow formed by each impeller and a crossing angle by using a pair of impellers with such a close clearance that the discharge flows are easily linked between upper and lower-stage impellers. The result showed that the interaction of these circulating flows are affected by the crossing angle, and that the linkage of the circulating flows depends on the crossing angle.

That is, it was found that, with the change of the crossing angle of the upper and lower paddle impellers, the vertical arrangement of the pressure increase produced at the front faces of these paddle impellers and the pressure decrease produced at the rear faces varies, and that the most stabilized linkage of the discharged flows from the upper and lower paddle impellers occurs when the crossing angle is selected within a certain range.

A further detailed investigation of this relationship between the flow linkage and the crossing angle of the impellers suggested that when a discharge flow formed by one paddle impeller is headed for the high-pressure side of the other paddle impeller the interaction of discharged flows makes the flow linkage difficult. On the contrary, when a discharge flow of one impeller is headed for the low-pressure side of the other paddle impeller, a stable flow from the high-pressure side towards the low pressure side between the upper and lower-stage impellers is formed, and thus the flows discharged from these impellers can be properly linked. The flow linkage is strengthened by the optimum arrangement of pressure gradient, and this result leads to improvement of mixing efficiency.

Also, the inventors have reached the conclusion that the optimum arrangement of pressure gradient can be obtained when the upper paddle impeller preceeds the lower paddle impeller by a crossing angle of less than 90 degrees.

In order to confirm these conclusions the inventors conducted numerical simulations and mixing experiments by using a pair of paddle impellers as a model mixing apparatus. The effects of the following three factors on mixing were studied: (1) the crossing angle $\alpha$ of the upper and lower stage impellers measured from the lower impeller to the upper impeller in the direction of impeller rotation, (2) the clearance L between the upper and lower stage impeller, and (3) the discharge force balance between the upper and lower stage impellers.

A numerical simulation consists of a numerical analysis of flow and a mixing simulation using a result of the flow analysis. First, a three-dimensional fluid velocity distribution within the mixing tank was numerically computed and then the time change of concentration distribution of a diffusion material which was thrown into the liquid surface was simulated by using the result of flow computation. This numerical simulation was applied only to laminar flow conditions since the numerical flow analysis had good reliability under the laminar conditions.

On the other hand, mixing experiments were conducted by using large and small mixing tanks, one being 400 mm in inner diameter, 800 mm in height, 80 lt in capacity, and the other being 200 mm in inner diameter, 400 mm in height, and 10 lt in capacity. Measurement of mixing time was conducted by using a decoloring method of removing the color of iodine solution in a mixing tank through a reductive chemical reaction with sodium thiosulfate added into the tank at each start of measurement. The sodium thiosulfate solution to be added was previously adjusted to the same viscosity as the liquid in the tank, and mixing time was determined by referring to photographs of a decoloring process.

(1) First, the effect of the crossing angle $\alpha$ between the upper- lower-stage impellers on the flow and mixing process was evaluated by using numerical simulations. In the numerical calculations, 120 mm (0.6 D) diameter paddle impellers were vertically arranged at two stages, with a clearance L of 20 mm (0.1 D) in the mixing tank with an inner diameter, D=200. The liquid viscosity $\mu$ was 5 Pa.s, the density $\rho$ was 1400 kg/m$^3$ and the mixing Reynolds number Re was 8.4. Numerical simulations were conducted by changing the crossing angle $\alpha$ from 0 degree (the upper and lower-stage impellers were positioned in the same vertical plane) to 90 degrees under the common conditions of liquid depth, H=200 (1.0 D) and impeller speed of 2.08 rps. Typical examples of fluid velocity distributions and mixing processes obtained by the numerical simulations are shown in FIGS. 7(a) and 7(b).

The left-side of these figures show the velocity vector distributions in a vertical section of the mixing tank and at the right-side groups of four illustrations show concentration contours indicating the progress in mixing of a diffusion material. In particular, FIG. 7(a) shows the results at the crossing angle α of 45 degrees, and FIG. 7(b) shows the results at the crossing angle α of 0 degree.

When the crossing angle α is 0 degree, discharged flows from the upper and lower paddle impellers meet each other between the impellers, and this phenomenon disturbs smooth liquid conveyance between the upper and lower parts in the mixing tank. On the other hand, when the crossing angle α is 45 degrees, the liquid conveyance is smoothly promoted from the upper part to the lower part of the mixing tank as shown in FIG. 7(a).

The difference in the mixing processes corresponding thereto is as follows. When the crossing angle α is 0 degree, the diffusion material is not conveyed to the lower-stage impeller region in 30 seconds after charging the diffusion material. But when the crossing angle is 45 degrees, the diffusion material reaches the tank bottom in 30 seconds. That is, linkage of the discharged flows and fluid mixing are promoted faster at the crossing angle of 45 degrees than at 0 degree. Investigations of various crossing angles α were made by using this method, and the optimum crossing angle α was found to range from 30 degrees up to less than 90 degrees, and preferably from 45 degrees up to 75 degrees, and the above-described inference was confirmed to be correct.

(2) Subsequently, for the purpose of grasping an optimum range of the impeller clearance between the upper and lower-stage impellers, numerical analyses of flow were conducted with the crossing angle of 45 degrees. Also, the impeller clearance L was changed within the range of from 10% to 30% of the inner diameter D of the mixing tank. The conditions of the numerical analyses were the same as those described above. Velocity distributions obtained by the numerical analyses are shown in FIGS. 8(a), 8(b), and 8(c). These figures show the velocity vector distributions in the right half portion of a vertical section of the mixing tank. FIG. 8(a) shows an example of the impeller clearance L set at 0.1 D (10%), FIG. 8(b) shows an example of the impeller clearance L set to 0.2 D (20%), and FIG. 8(c) shows an example of the impeller clearance L being set to 0.3 D (30%). With increasing the clearance L from 0.1 D to 0.3 D, the flow into the lower paddle impeller region from the upper paddle impeller decreases. When the impeller clearance L is 0.3 D, the flow from the upper paddle impeller interacts with the flow from the lower paddle impeller and returns to the central part of the tank without reaching the lower paddle impeller region. In the meantime, when the impeller clearance L is less than 0.2 D, the discharged flow from the upper paddle impeller flows into the lower paddle impeller region, and this means that linkage of the flows exists. Accordingly, high-efficiency mixing based on the linkage of the flows between the upper and lower impeller regions in the mixing tank can be attained by setting the impeller clearance L so as to be less than 0.2 D, preferably 0.1 D.

(3) Furthermore, a discharge force balance between upper and lower-stage impellers is an important factor in achieving high-efficiency mixing by the use of a multistage impeller structure. In this investigation the discharge force balance was taken into account in the laminar and turbulent flow ranges and there resulted the idea that a retreat blade should be used as the lower stage impeller in order to increase the discharge flow at the lower part of the mixing tank. This idea improved the apparatus so as to be applicable to a wider viscosity range and increased its power efficiency in mixing. Flows from a flat blade impeller and a retreat blade impeller were numerically analyzed in the laminar flow range in order to compare the two impellers with respect to their discharge flow velocities and the results are shown in FIGS. 9(a) and 9(b).

FIG. 9(a) shows a circular distribution of radial velocity in the discharge flow of the retreat blade impeller, while FIG. 9(b) shows that of the flat blade impeller.

As shown by the comparison, the retreat blade has no inward flow at the rear of the blade tips, which on the other hand occurs in the case of the flat blade as shown in FIG. 9(b) by the symbol S. That is, the retreat blade discharges fluid at a wider angle than the flat blade. Also, the retreat blade has a maximum discharge flow velocity 30% greater than that of the flat blade.

On the other hand, since the discharge flow rate and velocity largely depend on the impeller diameter, the discharge flow in the lower part of the mixing tank can be easily increased by using a lower stage impeller with a larger diameter than the upper stage impeller.

In the laminar flow range, i.e., a viscosity range over 2 Pa.s for the 400 mm diameter tank, mixing could be done well throughout the mixing tank by the multistage paddle impellers mounted at the crossing angle α of 45 degrees and at the blade clearance L of 0.1 D according to the above-described optimum conditions. In the transition flow range where a flow changes from laminar to turbulent, however, the linkage of flows between the upper and lower-stage impellers became unstable and therefore, this caused a delay in mixing.

Other investigations resulted in the next idea for solving the above-mentioned problem. When the upper and lower stage impellers are modified to overlap in their vertical coverages at least at blade edge parts furthest from the shaft, the discharge flow from the upper stage impellers would penetrate into the rotational zone of the lower stage impeller even in the transition flow range. Thus, the flow linkage would be restored to a stable state so as to bring improved mixing efficiency.

For confirming this idea, strip-type fins were attached to the upper paddle impellers at the lower ends of blade edges furthest from the shaft. The fins projected downward so as to overlap with the lower paddle impeller. Then mixing experiments were performed at viscosities somewhat less than 2 Pa.s under the above-described conditions.

The result showed that the fins actually help the flow linkage become stabilized and the mixing improved. Also, it was confirmed that the provision of the fins at the upper stage impeller brings not only uniform and satisfactory mixing in both the transition and turbulent flow range but also resulted in better mixing than the impellers without fins in the laminar flow range.

The present invention has been accomplished on the basis of several conditions determined by the above-described surveys. That is, rapid mixing is realized throughout the linkage of discharge flows from individual stage impellers by a multiple stage structure with wide paddle impellers in which each upper stage impeller is advanced in the direction of rotation with a crossing angle less than 90 degrees from its adjacent lower stage impeller.

Furthermore, more rapid and reliable mixing can be assured by more stabilized linking of the discharge flows from the upper and lower-stage impellers with a crossing angle from 45 to 75 degrees.

Furthermore, the radially outer parts of the lower-stage impeller blades may retreat or be angled rearward in the rotational direction to increase the discharge flow in the lower part of the mixing tank. By using a retreat or angled blade impeller, the flow linkage in the mixing tank is still improved, and this effect leads the apparatus to be applicable to a wider viscosity range and to have higher power efficiency in mixing.

Furthermore, a greater discharge flow in the lower part of the mixing tank is obtained by increasing the diameter of the lower stage impeller so as to be larger than the upper stage impeller, and this leads to still stabilized flow linkage in the turbulent flow range.

Furthermore, the impeller clearance between the adjacent upper and lower paddle impellers is set so as to be less than 20% of the inner diameter of the mixing tank, thereby more stabilized linkage of flows from the upper and lower-stage impeller is obtained.

Furthermore, reliable and stabilized flow linkage in the transition flow range is obtained by overlapping the upper and lower adjacent paddle impellers in their vertical coverages at least at blade edges furthest from the shaft and thereby good and uniform mixing in the transition flow range is attained.

BRIEF DESCRIPTION OF THE DRAWINGS

The present invention will become more fully understood with the detailed description given hereinbelow and the accompanying drawings which are given by way of illustration only, and thus are not limitative of the present invention, and wherein:

FIGS. 1(a) and 1(b) show a mixing apparatus of a first embodiment according to the present invention, in which FIG. 1(a) is a partially cutaway perspective view of the mixing apparatus and FIG. 1(b) is a sectional view taken along line I–I of FIG. 1(a);

FIG. 3 is a partially cutaway perspective view of a mixing apparatus of another embodiment according to the present invention;

FIGS. 4(a)–(c) are views explaining the overlapped form of the impellers according to the present invention;

FIGS. 5(a) and 5(b) show a mixing apparatus of a further embodiment, in which FIG. 5(a) is a front sectional view and FIG. 5(b) is a cross sectional view taken along line V—V of FIG. 5(a);

FIGS. 8(a)–(c) show the velocity vectors in three mixing apparatuses with different impeller clearances.

DESCRIPTION OF THE PREFERRED EMBODIMENTS

Hereinafter preferred embodiments of mixing apparatuses according to the present invention will be explained with reference to the accompanying drawings.

Figure 1A:
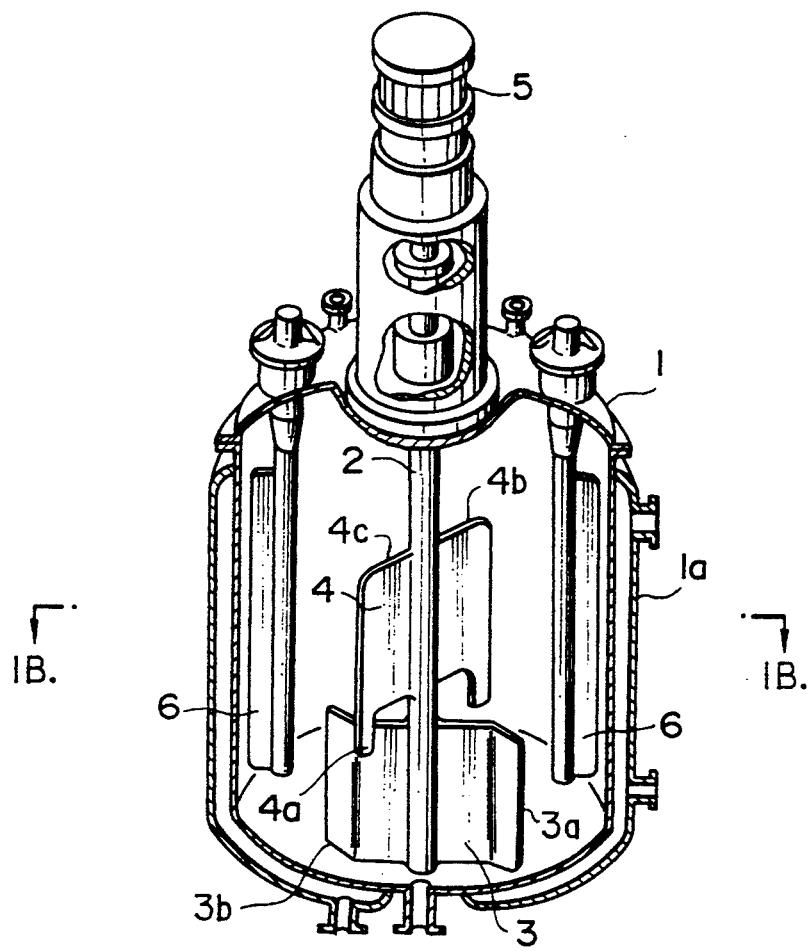
Figure 1B:
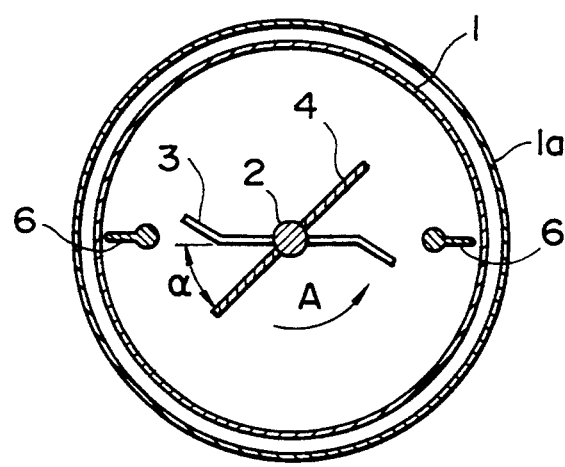

In FIGS. 1(a) and 1(b) numeral 1 denotes a glass-lined tank. This mixing tank 1 is made of a vertical cylindrical tank fitted with a jacket 1a for heat exchange through the tank wall. Two baffles 6 are vertically inserted from the top of the tank at symmetrical positions close to the cylindrical wall of the tank. Baffles are not always required for mixing of highly viscous liquids.

Numeral 2 refers to a rotating shaft. The rotating shaft 2 is vertically installed at the center of the mixing tank 1 and is rotated by a drive unit 5 mounted at the center of the top of the mixing tank 1. Its rotational direction is indicated by the arrow A in FIG. 1(b).

Numeral 3 refers to a lower-stage impeller. This lower-stage impeller is a two-bladed paddle impeller with a lower edge formed along the curved surface of the bottom of the mixing tank and both of the radially outer parts of the impeller 3 are angled in the opposite direction of the impeller rotation. This lower stage impeller is mounted on the lower end portion of the rotating shaft 2, close to the bottom surface of the mixing tank 1. Impeller 3 has first and second blades 3a, 3b. The vertical (height) dimension of each of the blades 3a, 3b is at least as great as their respective horizontal dimension, as is shown in FIGS. 1(a) and 1(b). These blades, along with the blades 4b, 4c of impeller 4 are substantially planar as shown. The diameter of impeller 3 is at least substantially one-half the inner diameter of the tank 1 and allows for a radial space for the baffles 6.

Numeral 4 represents an upper-stage two-bladed impeller. This upper-stage two-bladed impeller 4 has nearly the same impeller diameter as the lower-stage impeller 3, being fitted with strip-shaped fins 4a which project downward at the lower ends of blade edges furthest from the shaft, and being mounted on the rotating shaft 2 above the lower-stage impeller 3. It is preferable that the upper stage impeller diameter is slightly smaller than the next lower stage, as shown in FIG. 1(b). This upper-stage impeller 4 is set at the crossing angle $\alpha$ of 45 degrees, advanced in the direction of impeller rotation with respect to the lower-stage impeller 3. Impeller 4 has first and second blades 4b, 4c at a predetermined height with axial symmetry. The vertical (height) dimension of each of the blades is at least as great as their respective horizontal dimension, as is shown in FIGS. 1(a) and 1(b). At the same time, the lower tips of the fins 4a are located lower than the upper edge of the lower stage impeller 3 by a specific length $\Delta h$, and thus the fins and the lower-stage impeller overlap with each other in their vertical coverages.

In order to confirm that the above-described embodiment improves mixing efficiency in a medium to high viscosity range, the embodiment was compared with an apparatus of two-stage, two-bladed paddle impellers with the crossing angle having been used in the prior art, i.e., 90 degrees. The comparison was made in numerical mixing simulations giving velocity distributions in the tanks and concentration responses of a tracer material at two points near the liquid surface and the tank bottom, under the laminar flow condition of the Reynolds number, Re=11.7. Numerical simulations were carried out under such common conditions as two-stage impellers with the lower stage impeller diameter d of 120 mm (0.6 D), a liquid depth H of 250 mm (1.25 D), and an impeller speed of 2.08 rps. Also the overlapping length Δh of the upper-stage impeller fins and the lower-stage impeller was set at 0.05 D in the present embodiment. The results are shown in FIGS. 2(a) and 2(b).

Figure 2A:
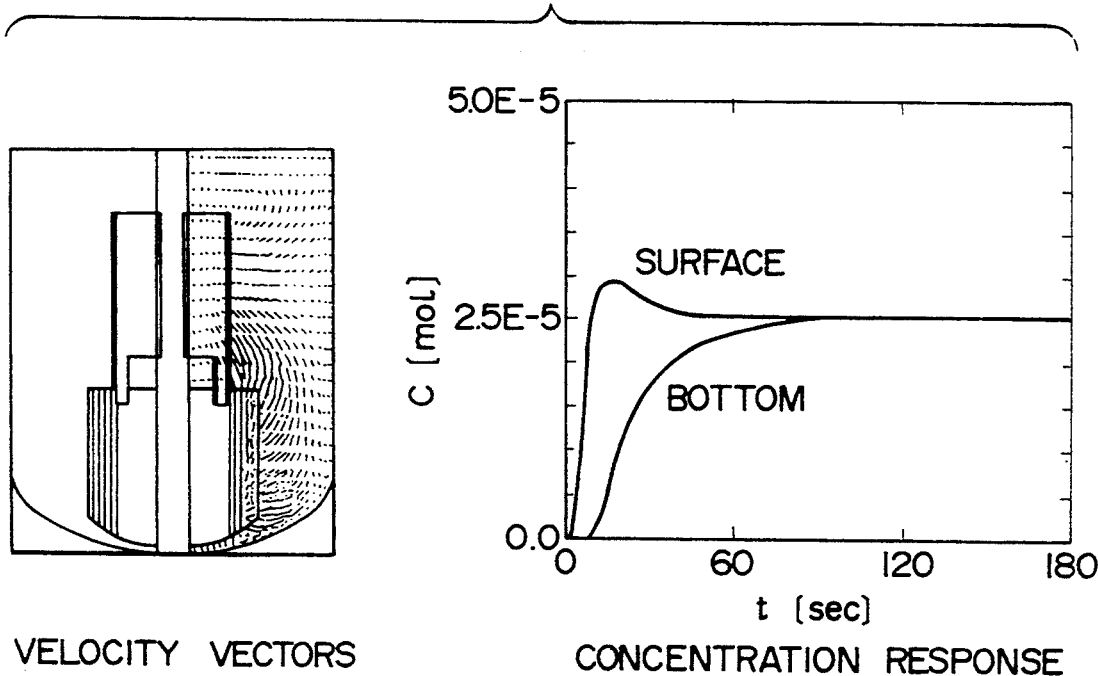
FIGS. 2(a) and 2(b) show velocity vectors of flows and concentration response curves in the mixing tank of the embodiment and another mixing tank with two-stage impellers set at the prior art crossing angle.
Figure 2B:
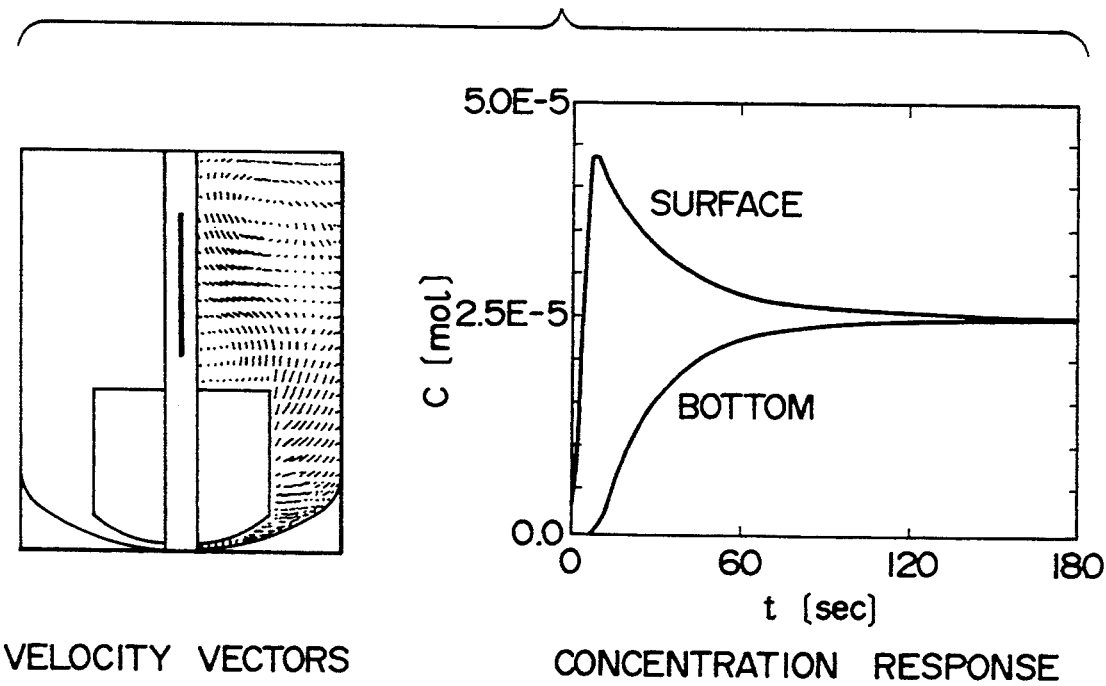

FIG. 2(a) shows the velocity vectors and concentration response curves of the present embodiment, while FIG. 2(b) shows those of the mixing apparatus with the prior-art crossing angle.

With the prior-art crossing angle impellers shown in FIG. 2(b), the flows caused by the upper- and lower-stage paddle impellers are linked but some concentration difference between the liquid surface and the tank bottom exists even after about 180 seconds, and this means incomplete mixing. In the mixing apparatus of the present embodiment shown in FIG. 2(a), however, the flows caused by the upper- and lower-stage impellers are well linked, and this becomes more clearly seen in that the concentrations near the liquid surface and the tank bottom are the same after about 90 seconds, and this means that complete mixing is attained. Therefore, it has been confirmed that the mixing apparatus according to the present invention has an effect of largely reducing the mixing time by as much as half or more as compared with the prior-art crossing angle impellers.

According to the mixing apparatus shown in FIG. 1(a), two stages of impellers, i.e., an upper and lower, are adopted. This is merely one example, and therefore, it is to be understood that the present invention is not limited thereto but three stage paddle impellers arranged as shown in FIG. 3 may be adopted. In addition, the number of paddle impellers may be increased to more than three in accordance with the ratio of liquid depth to tank diameter without deviating from the spirit and scope of the present invention.

FIG. 3 is a partly cutaway perspective view of another embodiment according to the present invention. In this figure, parts are designated by the same reference numerals as those in FIG. 1(a), which therefore will not be described.

In the mixing apparatus of this embodiment, two upper-stage impellers 4, fitted with fins 4a in the lower ends of blade edges furthest from the shaft are vertically mounted above the lower-stage impeller 3 on the rotating shaft 2. Thus a three-stage impeller structure is formed. The lower and mid-stage impellers are arranged with the crossing angle of 45 degrees and the mid- and upper-stage impellers are also so arranged. These two upper-stage impellers 4 overlap with individual adjacent lower impellers in their vertical coverages, at the heights where the fins are attached.

By using the present embodiment as described above, uniform mixing is assured even if the liquid depth varies, and also the impeller structure is easily applicable to larger-size, larger-capacity mixing apparatuses.

In the embodiments shown in FIGS. 1(a) to 3, except for FIG. 2(b), the strip-shaped fins 4a are attached to the upper-stage impellers 4 at the lower ends of both the blade edges furthest from the shaft. The fins 4a overlap in vertical coverage with the lower adjacent impeller to stabilize the linkage of flows between the upper and lower adjacent impellers. It should be noted that this is merely one example. Therefore, unless deviating from the spirit and scope of the present invention in which the upper and lower adjacent paddle impellers overlap in the vertical coverages at least at the radially outer edge parts, it is possible to overlap the upper- and lower-stage impellers by providing, for example, strip-shaped fins on one outer edge part of the lower-stage impeller 3 and the opposite outer edge part of the upper-stage impeller 4 as shown in FIG. 4(a), or fins with a fish tail form at the lower edge part of the upper-stage impeller 4 as shown in FIG. 4(b), or fins with a fish tail form in both the upper edge parts of the lower-stage impeller 3 and the lower edge part of the upper-stage impeller 4 as shown in FIG. 4(c).

Furthermore, in the embodiments shown in FIGS. 1(a) to 3, except for FIG. 2(b), the lower stage impellers have angled or retreat blades for the purpose of increasing the discharge flow in the lower parts of the mixing tanks, and this leads to both applicability over a wider range of viscosity and an increase in power efficiency. This retreat blade impeller, however, is not necessarily required. Also the lower stage paddle impellers having a larger diameter than the upper stage impellers may be used for the same purpose.

Figure 5A:
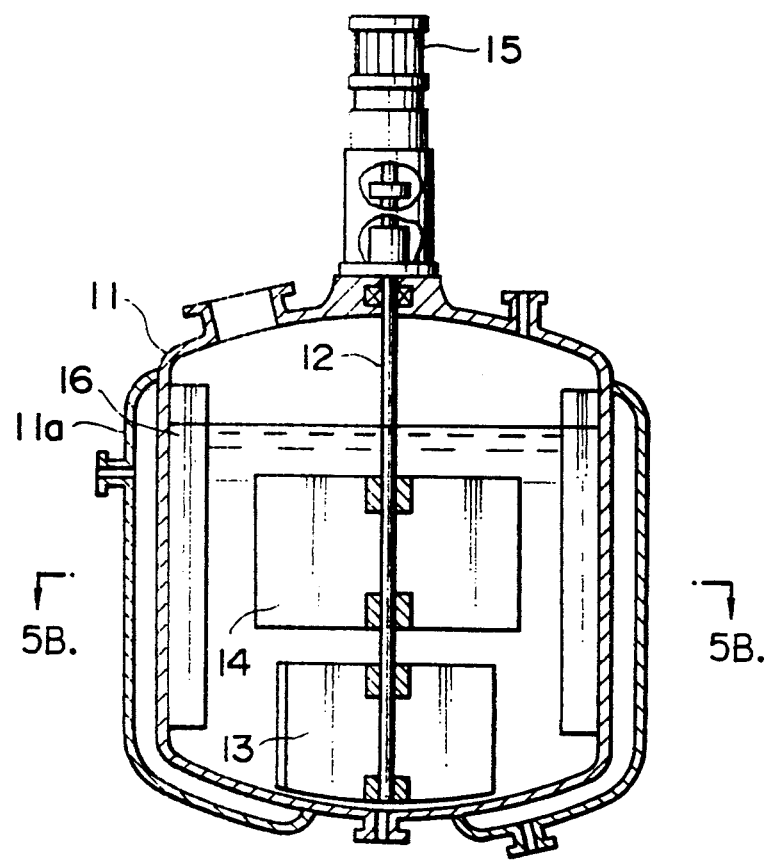
Figure 5B:
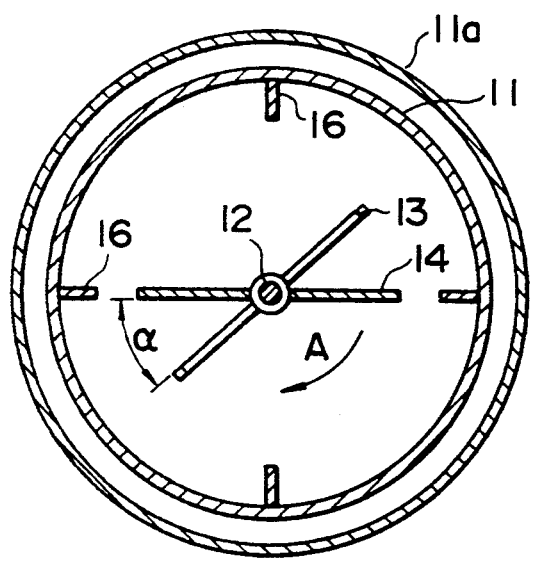
Figure 6A:
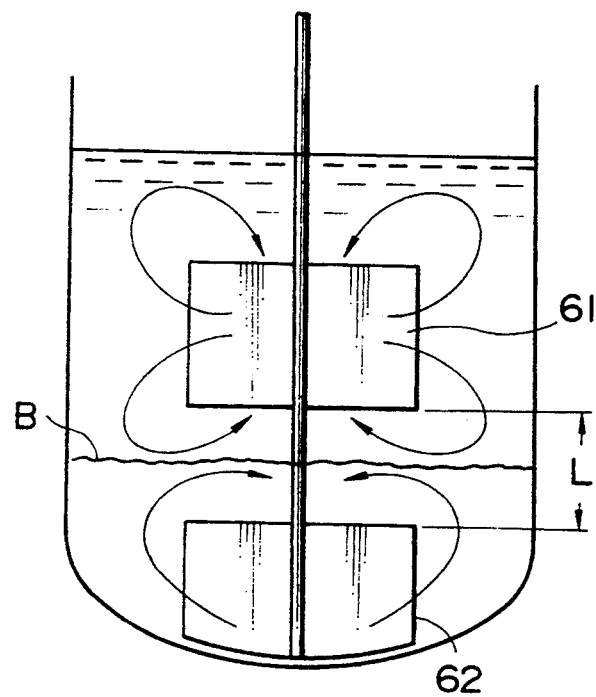
FIGS. 6(a) and 6(b) explain the relation between an impeller clearance and circulation flows in the mixing apparatus with two stage paddle impellers.
Figure 6B:
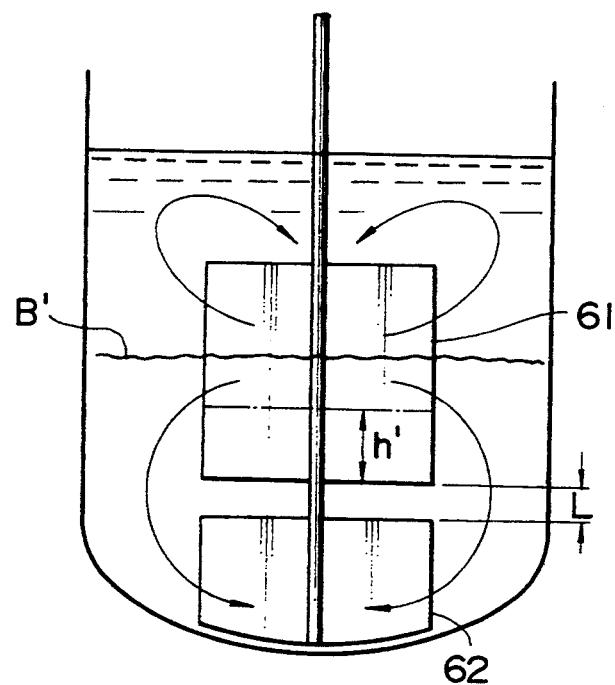
Figure 7A:
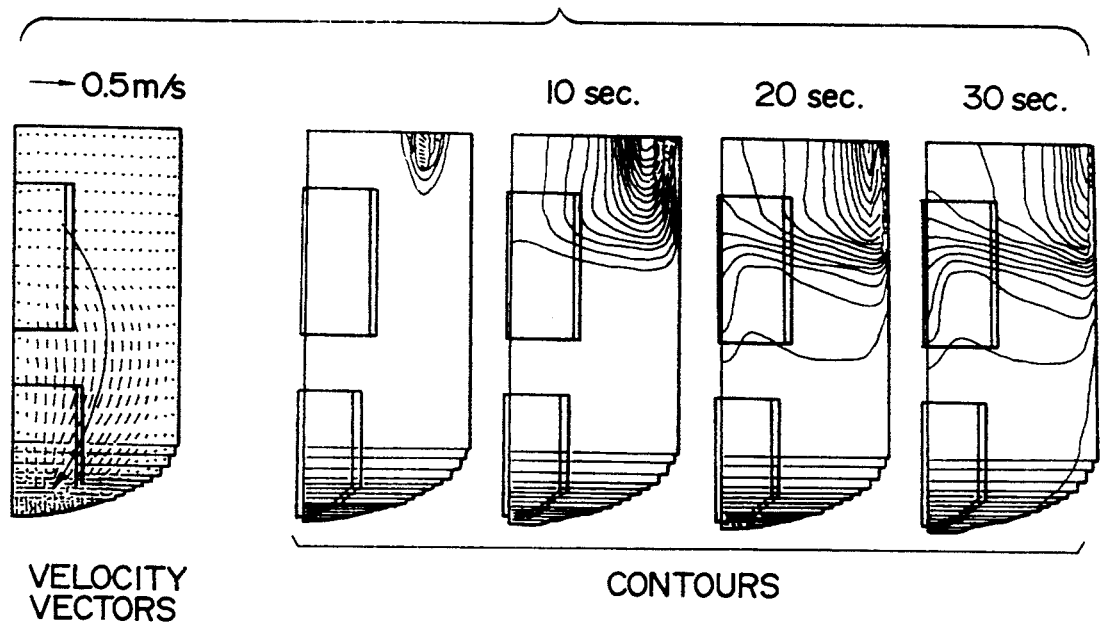
FIGS. 7(a) and 7(b) show velocity vectors in two mixing apparatuses with different crossing angles and also show concentration contours at several time points to express mixing progress.
Figure 7B:
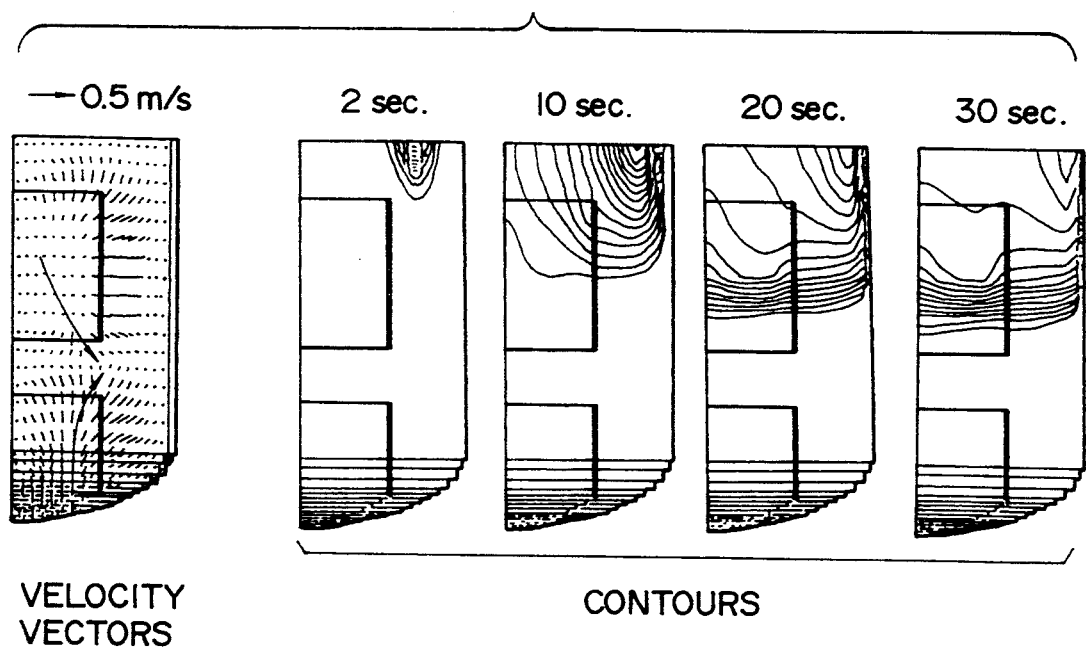
Figure 9A:
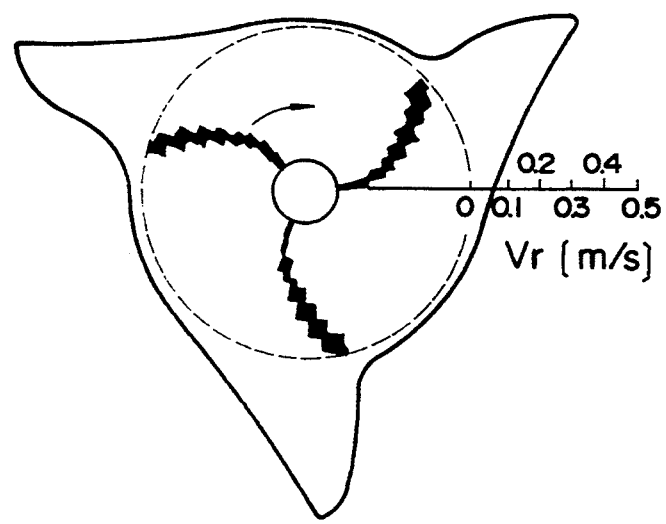
FIGS. 9(a) and 9(b) show circular distributions of radial velocity in the discharge flows of a retreat blade impeller and a flat blade impeller, respectively.
Figure 9B:
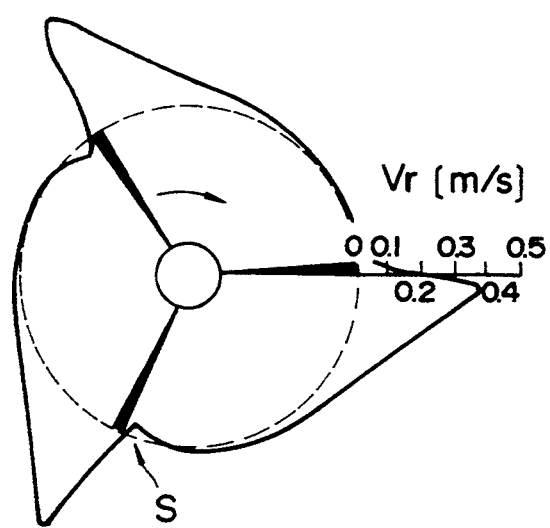

FIGS. 5(a) and 5(b) are views showing a mixing apparatus of another embodiment of the present invention, in which FIG. 5(a) is a front sectional view and FIG. 5(b) is a cross sectional view taken along line B—B in FIG. 5(a).

In FIGS. 5(a) and 5(b), numeral 11 indicates a mixing tank. This mixing tank 11 is a vertical cylindrical tank fitted with a jacket 11a for heat exchange through the tank wall. In the mixing tank 11, four baffle plates 16 are vertically installed at axially symmetrical positions.

Numeral 12 denotes a rotating shaft, which is vertically mounted at the center of the mixing tank 11 and rotated in the direction indicated by the arrow A in FIG. 5(b), by a drive unit 15 mounted on the top of the mixing tank 11.

Numeral 13 represents a lower-stage impeller and numeral 14 refers to an upper-stage impeller. These upper- and lower-stage impellers 14 and 13 are paddle impellers of the same impeller diameter d and the same vertical impeller dimension h, and they are mounted vertically lined on the rotating shaft with a specific clearance provided therebetween. The lower edge of the lower-stage impeller 13 is formed along the curvature of the bottom of the mixing tank 11 so that the impeller may be installed close to the bottom surface of the mixing tank 11. The upper-stage impeller is set at a crossing angle α less than 90 degrees ahead of the lower-stage impeller in the direction of impeller rotation and at an impeller clearance L from the lower-stage impeller 13. The clearance L is set at 20% or less of the inner diameter D of the mixing tank 11. Where the clearance L is 0.2 D or less and the impeller diameter d is 0.6 D as mentioned above and below, then the following relationship exists: $L/d \leq 0.2 D/0.6 D$ or $L/d \leq \frac{1}{3}$.

In the following discussion, actual mixing examples by apparatuses having the same constitution as the above-described embodiment will be described.

There were prepared three mixing apparatuses of the above-described constitution, which had crossing angles α of 45 degrees, 60 degrees and 75 degrees, respectively. They included mixing tanks with an inner diameter D of 200 mm, and upper- and lower-stage impellers 14 and 13 with a diameter d of 120 mm (0.6 D), a vertical impeller dimension h of 70 mm (0.35 D), and an impeller clearance L of 20 mm (0.1 D). Also a mixing apparatus which was of the same constitution as these three embodiments but with the prior-art crossing angle α of 90 degrees and a larger impeller clearance L of 60 mm (0.3 D) than the present embodiments was prepared as a comparison measure.

Experimental investigations were conducted to compare these four apparatuses with each other in terms of mixing time required for complete mixing of liquids, whose viscosity $\mu = 5$ Pa.s and density $\rho = 1400$ kg/m$^3$ at an impeller speed of 125 rpm.

The mixing time results for these four apparatuses were as follows:

150 sec for $\alpha = 90°$ and L=0.3 D (comparison measure);
104 sec for $\alpha = 45°$ and L=0.1 D (present invention);
102 sec for $+ = 60°$ and L=0.1 D (present invention);
114 sec for $\alpha = 75°$ and L=0.1 D (present invention).

When compared with the prior-art crossing angle and larger impeller clearance apparatus, the present embodiments improved the mixing efficiency by about 25% to 30%, therefore, proving an excellent mixing effect.

In the last embodiments, the impeller clearance L between the upper- and lower-stage impellers was 20 mm. However, this is merely an example and the clearance may be set to any length under 20% of the inner diameter D of the mixing tank.

As described in the above-noted Description of the Prior Art, reduction of this impeller clearance by increasing the vertical dimension of impellers causes an increase in power consumption. This impeller clearance will be selected so as to be less than 20%, preferably around 10%, of the inner diameter of the mixing tank from the viewpoints of rapid-mixing and low power consumption.

Furthermore, in the last embodiments, both upper- and lower-stage impellers used are paddle impellers of the same vertical dimension and diameter. These however, are merely examples and the lower-stage impeller may have retreat blades as the first embodiment has, or may have an impeller diameter larger than the upper-stage impeller for the purpose of smooth and effective flow linkage in the entire tank by increasing the discharge flow in the lower part of the tank.

According to the last embodiments, the mixing impeller structures included a vertically arranged two-stage impeller structure. This was adopted for ease of evaluation and ease of explanation of the effects of the present invention. It is noted that, for the purpose of improving the mixing efficiency, a multistage mixing impeller structure with more than two stages may be adopted in accordance with the ratio of liquid depth to tank diameter inasmuch as it does not deviate from the spirit and scope of the present invention.

As has been described above, the mixing apparatuses according to the present invention have a mixing impeller structure wherein multiple stages of the paddle impellers are vertically arranged in optimum positions for mixing, so that an appropriate pressure gradient is formed between the paddle impellers and that flows are smoothly linked throughout the mixing tank, thereby greatly improving the fluid mixing efficiency under flow conditions ranging from a turbulent flow to a laminar flow.

While only certain embodiments of the present invention have been described, it will be apparent to those skilled in the art that various changes and modifications may be made therein without deviating from the spirit and scope of the present invention as claimed.

What is claimed is:

1. A mixing apparatus, which comprises:
    a vertical cylindrical mixing tank;
    a rotating shaft vertically installed at the center of the interior of said vertical cylindrical mixing tank;
    at least a pair of vertically oriented two-bladed paddle impellers, each impeller consisting of a single pair of blades fixed so as to symmetrically radially extend from said rotating shaft, the paddle impeller at the lower stage being disposed close to the bottom surface of said mixing tank, and the paddle impeller positioned at the upper stage being arranged at a crossing angle of from 45 to 75 degrees ahead in a direction of rotation of the lower stage paddle impeller wherein a vertical dimension of each blade is at least as great as a horizontal dimension of each said blade and wherein said paddle impellers are positioned so as to have a clearance therebetween of 20% or less than an inside diameter of said mixing tank.

2. A mixing apparatus as claimed in claim 1, wherein the lower stage paddle impeller has a radially outer edge part which extends rearward with respect to the direction of impeller rotation.

3. A mixing apparatus as claimed in claim 1, wherein said lower stage paddle impeller has a horizontal diameter which is larger than said paddle impeller positioned in the upper stage.

4. A mixing apparatus as claimed in claim 1, in which vertically adjacent paddle impellers of said plurality of impellers are only partially overlapped in a vertical direction at least at a blade edge part furthest from said shaft.

5. A mixing apparatus as set forth in claim 1, wherein each said blade is substantially planar.

6. A mixing apparatus as claimed in claim 1, wherein a material to be mixed is located in said mixing apparatus and each of said impellers is located below the surface of the material to be mixed.

7. A mixing apparatus, which comprises:
    a rotating shaft vertically installed at the center of the interior of a vertical cylindrical mixing tank; and
    at least a pair of vertically oriented two-bladed paddle impellers, each impeller consisting of a single pair of blades fixed so as to symmetrically radially extend from said rotating shaft, the paddle impeller at the lower stage being disposed close to the bottom surface of said mixing tank, and the paddle impeller positioned at the upper stage being arranged at a crossing angle of from 45 to 75 degrees ahead in a direction of rotation of the lower stage paddle impeller wherein a vertical dimension of each blade is at least as great as a horizontal dimension of each said blade and wherein said paddle impellers are positioned so as to have a clearance therebetween of one-third or less of the impeller diameter.

8. A mixing apparatus as claimed in claim 7, wherein each said blade is substantially planar.

9. A mixing apparatus as claimed in claim 7, wherein a material to be mixed is located in said mixing apparatus and each of said impellers is located below the surface of the material to be mixed.

10. A mixing apparatus, which comprises:
    a vertical cylindrical tank;
    a rotating shaft vertically installed at the center of said tank;
    a plurality of stages of paddle impellers, at least two stages of which consist of two blades vertically fixed so as to symmetrically radially extend from said shaft, at least one of said blades having a vertical dimension which is at least as great as a horizontal dimension thereof, a lowest stage impeller of the impellers consisting of two blades disposed in proximity with the bottom of said tank and having an impeller diameter of at least substantially one-half the inner diameter of said tank and defining a radial space between the cylindrical tank wall and said lowest impeller for insertion of baffle plates, each upper stage impeller of the impellers having an impeller diameter substantially the same as or smaller than the next lower stage impeller and being placed on said shaft so as to form a clearance from the next lower stage impeller of not more than 20% of the diameter of the tank, wherein each upper stage impeller is set at an angle of between 45 and 75 degrees as measured around said shaft in a diameter of impeller rotation from the next lower stage impeller.

11. A mixing apparatus, which comprises:
a vertical cylindrical tank;
a rotating shaft vertically installed at the center of said tank; and
a plurality of stages of paddle impellers each of which consists of two blades vertically fixed so as to symmetrically radially extend from said shaft,
each of said blades having a vertical dimension which is at least as great as a horizontal dimension thereof,
a lowest stage impeller of the impellers having both blades disposed in proximity with the bottom of said tank and having an impeller diameter at least substantially one-half the inner diameter of said tank and defining a radial space between the cylindrical tank wall and said lowest impeller for insertion of baffle plates,
each upper stage impeller of the impellers having an impeller diameter substantially the same as or smaller than the next lower stage impeller and being placed on said shaft so as to form a vertical space from the next impeller of not more than 20% of the diameter of the tank, and
each upper stage impeller being set at a crossing angle of less than 90 degrees but greater than 0 degree as measured around said shaft in a direction of impeller rotation from the next lower stage impeller.

12. A mixing apparatus as claimed in claim 11, wherein the lowest stage impeller has a radially outer edge part which extends rearward with respect to the direction of impeller rotation.

13. A mixing apparatus as claimed in claims 11 or 12, wherein at least one pair of vertically mutually adjacent stage impellers only partly overlap each other in the vertical direction at a blade edge part furthest from said shaft.

14. A mixing apparatus as claimed in claim 11, wherein each said blade is substantially planar.

15. A mixing apparatus as claimed in claim 11, wherein a material to be mixed is located in said mixing apparatus and each of said impellers is located below the surface of the material to be mixed.

16. A mixing apparatus, which comprises:
a vertical cylindrical tank;
a rotating shaft vertically installed at the center of said tank; and
a plurality of stages of paddle impellers each of which consists of a single pair of blades vertically fixed so as to symmetrically radially extend from said shaft,
each of said blades having a vertical dimension which is at least as a great as a horizontal dimension thereof,
a lowest stage impeller of the impellers having both blades disposed in proximity with the bottom of said tank and having an impeller diameter at least substantially one-half of the inner diameter of said tank and defining a radial space between the cylindrical tank wall and the blades of said lowest impeller allowing a radial space enough to insert baffle plates,
each upper stage impeller of the impellers having an impeller diameter substantially the same as or smaller than the next lower stage impeller and being placed on said shaft so as to form a clearance from the next impeller of not more than 20% of the diameter of the tank wherein the next lowest stage impeller has a radially outer edge part which extends rearward with respect to the direction of impeller rotation.

17. A mixing apparatus which comprises:
a rotating shaft vertically oriented; and
a plurality of stages of paddle impellers each of which consists of a single pair of blades vertically fixed so as to symmetrically radially extend from said shaft,
each of said blades having a vertical dimension at least as great as a horizontal dimension thereof, and
each upper stage impeller having an impeller diameter substantially the same as or smaller than the next lower stage impeller and being placed on said shaft so as to form a clearance from the next impeller of not more than one-third of the diameter of said lowest stage impeller, wherein each upper stage impeller is set at a crossing angle of between 45 and 75 degrees as measured around said shaft in the direction of impeller rotation from the next lower stage impeller.

18. A mixing apparatus, which comprises:
a vertical cylindrical tank;
a rotating shaft vertically installed at the center of said tank; and
a plurality of stages of vertically adjacent paddle impellers each of which consists of a single pair of blades vertically fixed so as to symmetrically radially extend from said shaft, each of said blades having a vertical dimension at least as great as a horizontal dimension thereof,
a lowest stage impeller of said impellers having a radially outer edge part which extends rearward with respect to the direction of impeller rotation and disposed in proximity with the bottom of said tank and having an impeller diameter of at least substantially one-half of the inner diameter of said tank and defining a radial space between the cylindrical tank wall and said lowest impeller allowing enough radial space to insert baffle plates,
at least one upper stage impeller of the impellers having an impeller diameter substantially the same as or smaller than the next lower stage impeller and being placed on said shaft at a predetermined height such that the vertical space between said upper stage impeller and the next lower stage impeller is not more than 20% of said tank diameter at a part closest to said shaft and that at the same time said impellers only partly overlap in the vertical direction at a blade edge part furthest from said shaft where either of said two impellers has at least one blade member vertically extended to the other impeller.

19. A mixing apparatus as claimed in claim 18, wherein each said at least one upper stage impeller is set at a crossing angle of between 45 and 75 degrees as measured around said shaft in a direction of impeller rotation from the next lower stage impeller.

20. A mixing apparatus as claimed in claim 18, wherein each said blade is substantially planar.

21. A mixing apparatus as claimed in claim 18, wherein a material to be mixed is located in said mixing apparatus and each of said impellers is located below the surface of the material to be mixed.

* * * * *